(12) United States Patent
Bourget et al.

(10) Patent No.: US 8,890,378 B2
(45) Date of Patent: Nov. 18, 2014

(54) ELECTRICAL POWER SUPPLY DEVICE FOR ELECTRICALLY POWERING AT LEAST ONE ITEM OF EQUIPMENT ON A ROTARY ROTOR OF AN AIRCRAFT, AND AN AIRCRAFT

(75) Inventors: Vincent Bourget, Jonquerettes (FR); Serge Giordano, Marseilles (FR); Nicolas Imbert, Marseilles (FR); Charles Chuc, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 409 days.

(21) Appl. No.: 13/476,327

(22) Filed: May 21, 2012

(65) Prior Publication Data
US 2012/0299450 A1  Nov. 29, 2012

(30) Foreign Application Priority Data
May 24, 2011  (FR) ..................... 11 01599

(51) Int. Cl.
| | | |
|---|---|---|
| *H02K 7/14* | (2006.01) | |
| *B64D 15/12* | (2006.01) | |
| *B64C 27/18* | (2006.01) | |
| *H02K 7/18* | (2006.01) | |
| *H02K 19/16* | (2006.01) | |
| *H02K 41/03* | (2006.01) | |
| *H02K 35/02* | (2006.01) | |
| *H02K 1/27* | (2006.01) | |

(52) U.S. Cl.
CPC *B64D 15/12* (2013.01); *H02K 7/14* (2013.01); *B64C 27/18* (2013.01); *H02K 7/1861* (2013.01); *H02K 19/16* (2013.01); *H02K 41/031* (2013.01); *H02K 35/02* (2013.01); *H02K 1/27* (2013.01)
USPC .......... 310/67 R; 310/12.14; 310/14; 310/89; 310/90; 310/102 R; 310/113; 310/156.12; 290/1 R; 244/53 R

(58) Field of Classification Search
CPC ......... H02K 1/27; H02K 7/14; H02K 7/1861; H02K 19/16; H02K 41/031; H02K 35/02; B64C 27/00; B64C 27/18; B64D 15/12
USPC .................. 310/12.14, 14, 67 R, 89, 90, 113, 310/156.11, 156.12, 102 R; 290/1 R; 244/53 R
IPC ........................................................ H02K 7/14
See application file for complete search history.

(56) References Cited

U.S. PATENT DOCUMENTS

| | | | | |
|---|---|---|---|---|
| 3,002,718 | A | | 10/1961 | Hackenberger |
| 4,234,831 | A | * | 11/1980 | Kemmer et al. ............... 318/115 |
| 2002/0149279 | A1 | * | 10/2002 | Bartolotti ....................... 310/114 |

(Continued)

FOREIGN PATENT DOCUMENTS

| | | |
|---|---|---|
| DE | 20306735 U1 | 7/2003 |
| EP | 0629318 A1 | 12/1994 |

(Continued)

OTHER PUBLICATIONS

Search Report and Written Opinion; Application No. FR 1101599; dated Feb. 7, 2012.

*Primary Examiner* — John K Kim
(74) *Attorney, Agent, or Firm* — Brooks Kushman P.C.

(57) ABSTRACT

An electrical power supply device (10) for electrically powering equipment on a rotary rotor (2) of an aircraft (1), which rotor is driven by a shaft (5), said device (10) comprising a removable stick (11). The stick (11) includes an upper alternator (20) and an upper tube (12) secured to said shaft (5) so as to be constrained in rotation therewith, said upper alternator (20) having a plurality of upper coils (21) fastened to an upper inside peripheral surface (12') of said upper tube (12), said stick (11) having a rod (13) carrying an upper permanent magnet (22), said device (10) having a mechanism (30) so that said rod (13) and said upper tube (12) move with distinct rotary movements, said mechanism (30) having connection means (31) so as to be connectable to a reference member (8, 9) of an aircraft (1).

15 Claims, 8 Drawing Sheets

(56) References Cited

U.S. PATENT DOCUMENTS

| | | | |
|---|---|---|---|
| 2007/0158947 A1* | 7/2007 | Annen et al. | 290/1 R |
| 2007/0290556 A1* | 12/2007 | Hochhalter et al. | 310/12 |
| 2009/0295236 A1* | 12/2009 | Bott et al. | 310/12.14 |
| 2010/0252673 A1* | 10/2010 | Tourn | 244/17.11 |
| 2011/0024567 A1 | 2/2011 | Blackwelder et al. | |
| 2011/0074162 A1* | 3/2011 | Cottone et al. | 290/1 R |
| 2012/0299450 A1* | 11/2012 | Bourget et al. | 310/67 R |

FOREIGN PATENT DOCUMENTS

| | | |
|---|---|---|
| EP | 0777602 A1 | 6/1997 |
| EP | 1267474 A2 | 12/2002 |
| EP | 2218643 A1 | 8/2010 |
| FR | 2553596 A1 | 4/1985 |
| GB | 545305 A | 5/1942 |
| GB | 584563 | 1/1947 |
| WO | 2010015359 A1 | 2/2010 |

\* cited by examiner

ELECTRICAL POWER SUPPLY DEVICE FOR ELECTRICALLY POWERING AT LEAST ONE ITEM OF EQUIPMENT ON A ROTARY ROTOR OF AN AIRCRAFT, AND AN AIRCRAFT

CROSS REFERENCE TO RELATED APPLICATIONS

This application claims priority to FR 11 01599 filed on May 24, 2011, the disclosure of which is incorporated in its entirety by reference herein.

BACKGROUND OF THE INVENTION (1) Field of the Invention

The present invention relates to an electrical power supply device for electrically powering at least one item of equipment on a rotary rotor.

(2) Description of Related Art

The invention lies within the technical field of electrical power supply means for supplying electrical power to a rotary member, and more particularly for electrically powering de-icing/anti-icing members on a rotorcraft rotor.

Some aircraft are equipped with devices for de-icing/anti-icing airfoil surfaces, and in particular surfaces of the blades of a rotor. The problem of icing of such airfoil surfaces is well known in the aeronautical industry, it being possible for the aerodynamic profile of such surfaces to be adversely altered due to ice forming in flight after colliding with supercooled water droplets contained in the atmosphere.

This problem is often dealt with by equipping the airfoil surface with a heater structure.

However, it can be understood that it can be difficult for equipment present on a rotary assembly to be electrically powered from an electricity generator present in a static frame of reference within the airframe of an aircraft.

Various devices are known for conveying electricity to a rotary assembly mounted permanently and irreversibly on propellers, in particular on airscrews or on wind turbine rotor blade assemblies.

Document FR 2 553 596 describes a propeller including electrical energy generator means inside its hub for the purpose of powering an electrical system for altering the pitch of the blades of the propeller, and for the purpose of powering de-icing means.

Document EP 0 629 318 describes the use of a magnet mounted to rotate freely between two coil assemblies arranged inside a propeller.

Document EP 0 777 602 discloses a generator having coils carried by a rotor, those coils co-operating with a static permanent magnet.

Document EP 2 218 643 presents an electrical machine disposed inside a propeller for electrically powering resistance elements. The alternator comprises a stator secured to a static casing of the propeller, and coils secured to a rotary shaft of the propeller.

Document US 2011/0024567 describes electricity-generating apparatus arranged inside a contra-rotating two-airscrew turbo-prop system.

The same applies to Document GB 584 563.

Document WO 2010/015359 describes electricity generators arranged on a wind turbine rotor blade assembly for electrically powering means for altering the pitch of the blades of the rotor blade assembly, each generator having a rotary portion co-operating with a ring gear of the nacelle of the rotor blade assembly.

It can be observed that some of the preceding documents relate, in particular, to aircraft that might fly through clouds full of supercooled water droplets, and that are continually being faced with the problem of icing. It can therefore be advantageous to arrange a power supply device permanently inside the propeller of such an aircraft for de-icing or anti-icing purposes.

In the same way, a device making it possible to power electrical means for altering the pitch of a propeller may be present permanently on the propeller.

Conversely, some aircraft, and in particular rotorcraft, do not need such an electrical power supply device to be installed permanently.

And so there is known a device provided with an AC generator connected to a power de-icing unit. The power de-icing unit is, in particular, provided with an electrical rectifier and with a sequencer for powering a plurality of electrical cables in a predetermined sequence. In addition, for safety reasons, the power de-icing unit is duplicated.

The generator and the power de-icing unit are installed in a static frame of reference, namely in the airframe of a rotorcraft.

The device then includes a slip-ring assembly comprising a non-rotary portion and a rotary portion that are interconnected via a system of brushes rubbing on slip rings. For example, the non-rotary portion may have circular slip rings powered electrically via electrical cables coming from the power de-icing unit, the rotary portion having a brush traveling over said slip rings.

The non-rotary portion then powers a plurality of heater mats per blade of a rotor following the sequence programmed in the power de-icing unit for de-icing the blades or for preventing ice from forming on said blades, each mat being connected via an electrical cable to a brush of the rotary portion of the slip-ring assembly.

The slip-ring assembly may be arranged reversibly so as to be used during winter periods only or for particular missions.

However, the slip-ring assembly is very heavy and difficult to put in place, in particular due to the presence of a large number of slip rings and of electrical cables of large dimensions.

In addition, each brush of the slip-ring assembly rubbing against the corresponding slip ring tends to degrade the performance of said slip-ring assembly. Maintenance actions requiring the device to be removed must then be taken relatively often. Unfortunately, since the slip-ring assembly is sometimes difficult to access, the cost of the maintenance can be high and requires the rotorcraft to be taken out of service for a long period of time.

Finally, it can be noted that, since the power de-icing unit is installed in the airframe of the aircraft, said power de-icing unit can disturb the surrounding electrical equipment. In addition, the power de-icing unit has overall size that is non-negligible and that is detrimental.

Documents U.S. Pat. No. 3,002,718, GB 545 305, EP 1 267 474, and DE 203 06 735 are also known.

BRIEF SUMMARY OF THE INVENTION

An object of the present invention is thus to propose a removable electrical power supply device that aims to overcome the limitations associated with a slip-ring assembly of the above-described type, or indeed associated with the use of a power de-icing unit in the zones that are usually equipped with such an electrical unit.

According to the invention, an electrical power supply device for electrically powering at least one item of equipment on a rotary rotor driven by a shaft comprises a removable stick suitable for being secured reversibly to the shaft. In particular, the electrical power supply device aims to power equipment on a rotary rotor of an aircraft.

In particular, this device is remarkable in that the stick includes an upper alternator and an upper tube suitable for being reversibly secured to the shaft so as to be constrained in rotation therewith, the upper alternator having a plurality of upper coils fastened to an upper inside peripheral surface of said upper tube. The stick then has a rod carrying at least one upper permanent magnet of the upper alternator separated from the upper coils by a predetermined upper airgap, at least one upper rolling bearing means being interposed between the rod and the upper tube for the purpose of guiding the rod. This device has a mechanism so that the rod and the upper tube move with distinct rotary movements, the mechanism having connection means so as to be connectable to a reference member of an aircraft.

It should be noted that the term "alternator" is used to a mean an electrical machine including at least one assembly that is driven in rotation in order to generate electricity.

Thus, in accordance with the invention, a removable device is used that is inserted into the shaft of a rotor, the upper tube being fastened to said shaft.

The mechanism enables the rod and the upper tube to move with distinct rotary movements, namely movements in different directions and/or at different speeds in order to enable the alternator to generate electricity.

This device thus represents an effective alternative to slip-ring assemblies having brushes.

In addition, the removable nature of the device makes it particularly advantageous when applied, in particular, to the limited technical field of rotorcraft. It is also easy to perform maintenance on the device, by removing it from the rotary rotor.

It is important to note that an alternator is generally voluminous. However, contrary to existing preconceptions, it is possible to arrange the device at least in part inside an aircraft shaft for the purpose of electrically powering equipment on a rotary rotor.

Even more surprisingly, the presence of the mechanism makes it possible to generate a relatively large electric current within a shaft rotating at low speed, such as a shaft of a lift rotor of a rotorcraft.

In addition, this device may have one or more of the following characteristics.

For example, with the stick having a projecting fastening flange, the device may optionally further comprise a wheel made of a flexible material chosen from the group comprising elastomers, and fastened to said flange, said wheel being provided with peripheral dogs suitable for co-operating by shape interference with a rotary member of a rotary rotor.

In particular, the wheel serves to prevent the shaft from jamming in the event that the upper alternator jams.

In addition, with the rotary rotor that reversibly receives the device having a plurality of distinct electrical zones, the upper alternator may include one upper coil per electrical zone.

The upper coils form an upper winding that may be multi-phase, each phase corresponding to a respective electrical zone, namely, for example to a given blade or to certain heater mats of the rotary rotor. The electrical architecture then obtained is simple, and can offer lower weight, lower cost and/or improved compactness relative to a system implementing slip-ring assemblies having brushes.

It should be noted that the amplitude of the voltage delivered may be adapted by the upper winding so as to correspond to the needs of the electrical apparatus to be electrically powered, such as heater mats, so as to simplify the dimensioning and the cost of such equipment.

In addition, by highly segregating the upper coils, the risk of a short-circuit occurring that might generate high braking torque is minimized.

In another aspect, each upper coil may optionally have redundancy for safety reasons.

In addition, the torque induced from the upper coils may be equal to the nominal operating torque of the upper alternator. In the event of failure of the upper alternator, the torque induced by said upper alternator then has no unforeseen influence on operation of the rotary rotor.

In order to prevent the upper alternator from inducing high braking torque on the rotary rotor in the event of failure, it is then possible to implement a wheel made of flexible material, upper coils that are highly segregated, an upper alternator generating induced torque due to the upper coils short-circuiting that is referred to as "short-circuit torque" and that is equal to the nominal operating torque of said upper alternator. Similarly, it is possible to provide fuse members of the electrical type such as an electrical wire of an upper coil that is of locally reduced diameter, or a mechanical fuse member of the upper tube, for example.

In a first embodiment, the mechanism is provided with connection means including a self-locking coupling for coupling to a static reference member, e.g. a member fastened to the bottom of a main gearbox driving the shaft of the rotary rotor.

The mechanism may hold the rod of the device static, the upper tube conversely being driven in rotation by the shaft of the rotary rotor.

In a second embodiment, the mechanism is provided with connection means provided with a drive coupling suitable for being driven by a rotary reference member.

The mechanism puts the rod of the device into engagement with a rotary reference member, such as a cog of an epicyclic gear stage of a main gearbox, for example.

The rod then moves with a rotary movement in a first direction at a first speed by being driven by the connection means, the upper tube moving in a rotary movement in a second direction at a second speed by being driven by the shaft, the second direction optionally coinciding with the first direction.

In a third embodiment, the mechanism includes a mechanical transmission provided with a plurality of planet gears meshing firstly with a toothed ring and secondly with a sun gear on said rod, the planet gears being carried by a planet carrier provided with a self-locking member co-operating with a static receiving member.

The mechanical transmission may then be an epicyclic gear train provided with one or more stages of planets, so as to reduce or increase the speed of rotation of the rod relative to the speed of rotation of the ring.

In a variant of this third embodiment, the toothed ring may be secured to the upper inside peripheral surface of the upper tube. In addition, the self-locking member may be a self-locking coupling of the connection means, for the purpose of connecting the mechanism to a static reference member of an aircraft.

In another variant, the toothed ring may be driven by connection means provided with a drive coupling suitable for being driven by a rotary reference member. For example, the rotary reference member is caused to move by a main gearbox.

It can be understood that it is possible to combine these embodiments.

In another aspect, the device further comprises a lower alternator provided with a lower tube provided with a non-rotary connection member, this lower alternator having a plurality of lower coils fastened to a lower inside peripheral surface of the lower tube, the rod carrying at least one lower permanent magnet of the bottom alternator separated from the lower coils by a predetermined lower airgap, at least one bottom rolling bearing means being interposed between the rod and the lower tube. It should be noted that the lower permanent magnet and the upper permanent magnet may constitute a single, common magnet. The lower coils jointly constitute a lower winding.

Therefore, the upper alternator enables equipment on a rotary rotor to be electrically powered, the lower alternator enabling equipment present in the airframe of the aircraft to be electrically powered.

In addition, said lower alternator may be used to brake the rod of the device.

In addition, permanently and/or during certain operating stages of the aircraft, the lower coils of the lower winding in the static portion can be electrically powered by an electronic power and control installation from an energy source stored in the airframe of the aircraft. The alternator is therefore used in drive mode rather than in generator mode so as to deliver mechanical power to the rotary portion.

Optionally, the connection member may include coupling means making it possible for a first portion and a second portion of the connection member to be out of alignment with each other, so as to prevent the device from jamming in the event that the shaft of the rotary rotor flexes.

In addition, the lower tube includes a planet carrier carrying a plurality of planet gears in engagement with a sun gear on the rod and with a toothed ring.

In addition to providing an electrical power supply device, the invention also provides an aircraft provided with a rotary rotor and including such a removable device. The electrical power supply device may then be fastened reversibly to a shaft of said rotary rotor in such a manner as to extend inside said shaft.

BRIEF DESCRIPTION OF THE SEVERAL VIEWS OF THE DRAWINGS

The invention and its advantages appear in more detail from the following description of embodiments given by way of illustration and with reference to the accompanying figures, in which.

Elements that are present in more than one figure are given the same references in each of them.

DETAILED DESCRIPTION OF THE INVENTION

Figure 1:
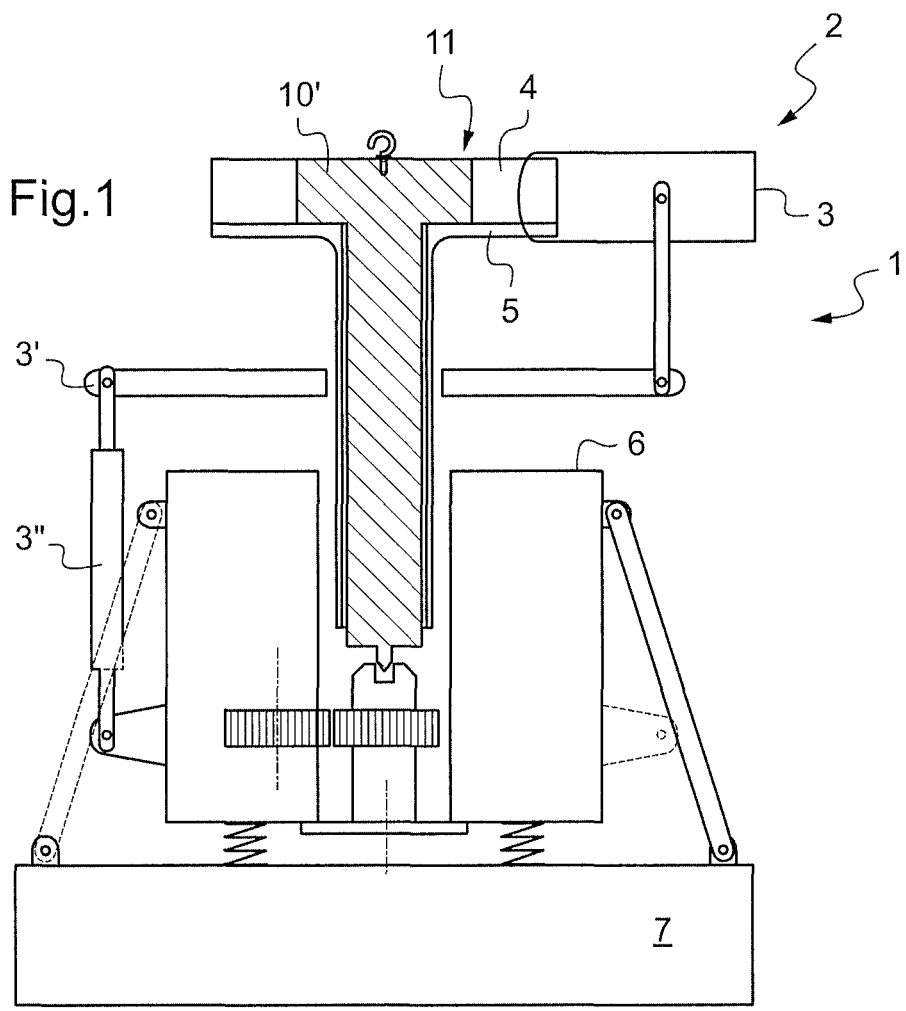
FIG. 1 is a diagram showing an aircraft provided with an electrical power supply device of the invention.

FIG. 1 shows an aircraft 1 having an airframe 7 carrying a main gearbox 6 driving a shaft 5.

Said shaft 5 is constrained in rotation with a hub 4 provided with a plurality of blades 3, it being possible for the pitch of the blades 3 to be modified by servo-controls 3" by means of an assembly of two control plates 3' that are sometimes referred to as "swashplates" and that are shown diagrammatically.

In addition, the rotary rotor may have electrical equipment. Therefore, the aircraft 1 includes a removable electrical power supply device 10, this electrical power supply device 10 including a stick 11 that can be inserted at least in part into the shaft 5 so as to generate electricity and so as to transmit it to said equipment.

Figure 2:
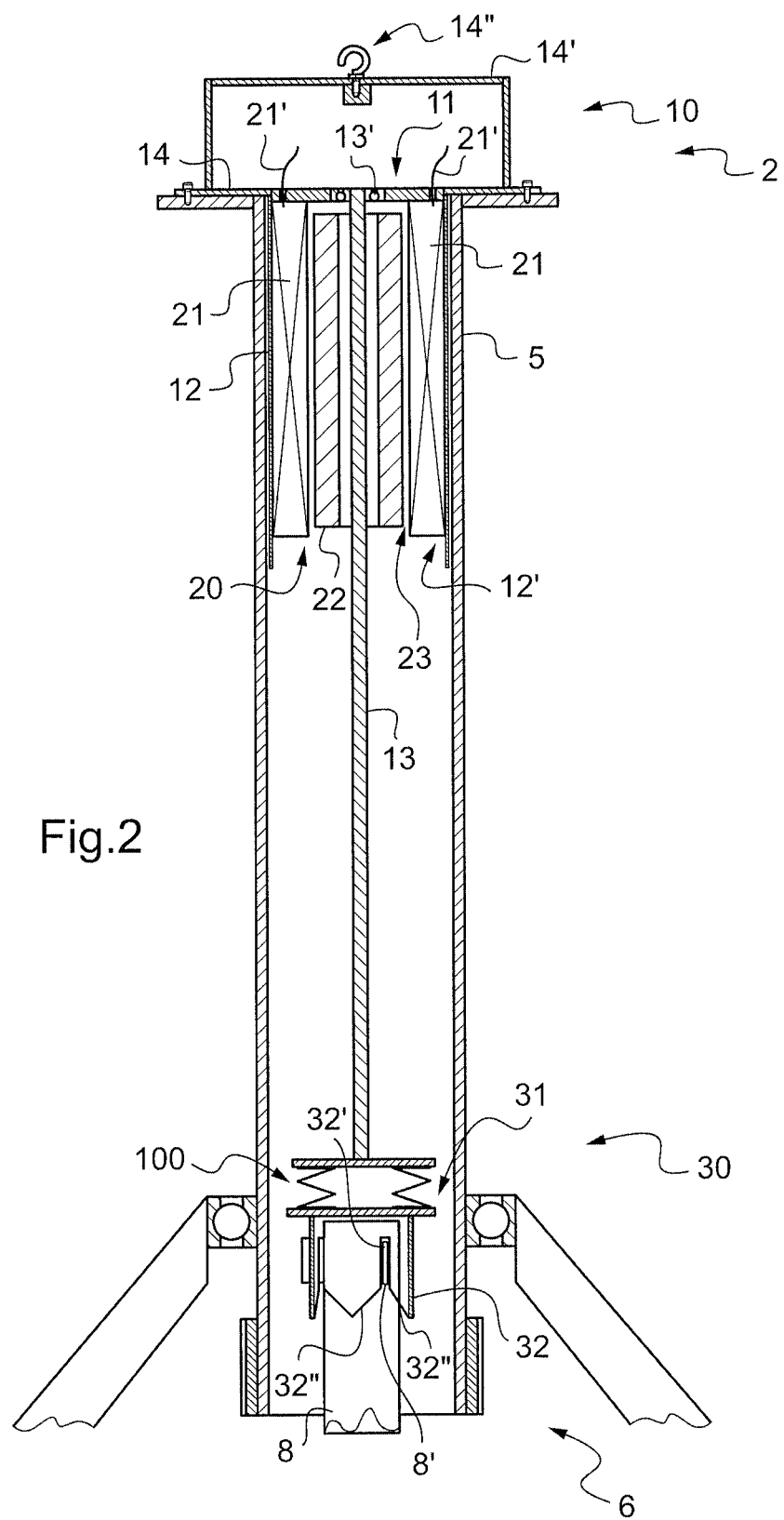
FIG. 2 shows said device in a first embodiment.

FIG. 2 shows the electrical power supply device 10 in a first embodiment.

Independently of the embodiment, the stick 11 includes an upper tube 12 that can be fastened to the shaft 5 via a projecting flange 14, screwed for example to a shoulder of the shaft 5. In addition, the flange 14 can co-operate with hoist means 14' provided with a hoisting hook 14".

In order to install the device 10 on a rotary rotor, it suffices to slide the upper tube 12 of the stick 11 into the shaft 5, and then to screw the flange 14 to the shoulder of the shaft 5 so as to secure the upper tube 12 to the shaft 5. It is possible to use the hoisting hook to handle the stick 11.

This operation is reversible, it being possible for the device 10 to be removed when the rotor is no longer provided with electrical equipment to be electrically powered, or, for example, for maintenance purposes.

For electrically powering such equipment, the device 10 has an upper alternator 20 housed in the upper tube 12 so as to supply electrical energy to the equipment of the rotary rotor, via wire connections 21'.

This upper alternator 20 has a plurality of upper coils 21 forming an upper winding. Each upper coil 21 is fastened inside the upper tube 12, namely to an upper inside peripheral surface 12' of said upper tube 12.

In addition, the upper alternator 20 includes at least one upper permanent magnet 22 arranged on a rod 13 of the stick 11, a predetermined upper airgap 23 separating the upper permanent magnet 22 from the upper coils 21.

The rod 13, the upper tube 12 and the shaft 5 are then concentric and they extend axially along the axis of rotation of the rotary rotor. In addition, at least one upper guide means provided with upper ball or roller rolling bearing means 13' is interposed between the upper tube 12 and the rod 13.

Other rolling bearing means may be implemented, in particular for holding the rod 13 in position.

In addition, in order for the alternator to generate electricity, the device 10 includes a mechanical mechanism 30 so that the upper alternator supplies the electrical power required by the manufacturer to given items of equipment. This mechanism then imparts distinct rotary movements to the rod 13 and to the upper tube 12, and thus to the upper permanent magnet 22 and to the upper coils 21, making it possible to generate electricity that is transmitted by the upper coils 21 to the equipment on the rotary rotor via wire connections 21'.

It can then be observed that the device can be arranged in the shaft 5 of an aircraft and that it makes it possible to generate electricity even if the shaft is rotating at a relatively low speed. The invention is then applicable, in particular, to a helicopter.

This mechanism 30 includes quick connect means 31 for quick connection to a reference member of the aircraft.

Depending on the embodiment, the mechanism may include connection means for connecting to a static reference member so as to hold the rod 13 static and/or connection means for connecting to a rotary reference member of the aircraft so that the rod 13 and the upper tube 12 are driven in rotation about the axis of rotation of the rotary rotor at distinct speeds and/or in distinct rotation directions.

Figure 3:
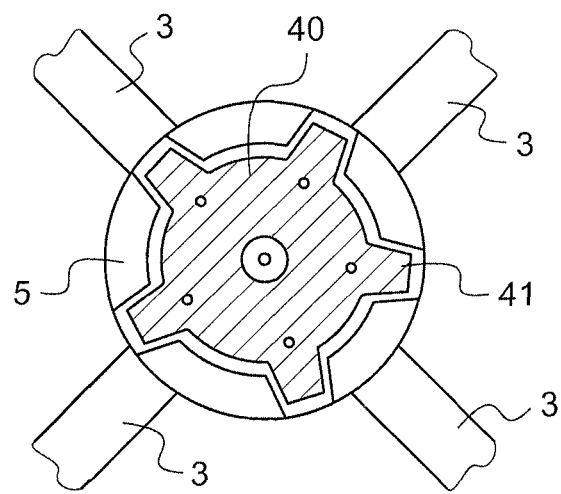
FIG. 3 is a diagram showing a flexible wheel arranged between the upper tube of the device and a shaft of a rotor.

With reference to FIG. 3, the device 10 may include upper fuse means comprising a wheel 40 interposed between the flange 14 of the stick 11 and the shaft 5, so as to prevent the rotary rotor from being jammed by any accidental jamming of the upper alternator 20. This wheel 40 is then fastened to the flange and it co-operates by shape interference with a rotary member of the rotary rotor.

For example, the wheel 40 may be provided with a plurality of dogs 41 received in recessed spaces in the shaft 5, the wheel 40 being made out of a flexible material to be chosen from the group comprising elastomers.

In normal operation, the shaft 5 drives the upper tube 12 in rotation through the wheel 40. Conversely, if the upper alternator 20 jams, the flexibility of the wheel enables the dogs 41 to deform in such a manner as not to jam the rotation of the rotor.

The wheel 40 therefore constitutes means for mechanically declutching in the event that the device 10 jams. In addition, it can be understood that the wheel 40 can make it possible to take up manufacturing clearances, or indeed to compensate for any deformation in the shaft in certain stages of flight.

In alternative manner, with reference to FIG. 1, the means for fastening the flange 14 to the shaft 5 may include a fuse section, it being possible for these fastening means to include pins or the like, for example.

In addition, it is conceivable to use upper coils that, during a short-circuit, generate induced torque equal to the nominal operating torque of the upper alternator 20. If failure of the short-circuit type occurs, the upper alternator generates induced torque equal to the nominal operating torque and thus does not disturb the rotary movement of the rotary rotor.

In another aspect, the electrical wires of the upper coils may, for safety reasons, include a zone of reduced section for acting as a fuse in the event of a short-circuit, the upper coils also advantageously having redundancy.

In addition, the rotary rotor may have a plurality of distinct electrical zones, each blade or each heater mat representing a respective electrical zone, for example. The upper tube 12 may then contain one upper coil 21, optionally with redundancy, per electrical zone.

In addition, it is possible to manufacture the upper winding while taking care to segregate the upper coils 21 in order to reduce the risks of short-circuiting.

Furthermore, in the first embodiment shown in FIG. 2, the mechanism 30 is provided with connection means 31 for holding the rod 13 static. The upper permanent magnet 22 and the upper coils 21 thus move with distinct rotary movements, the rod 13 having a zero speed of rotation and the upper tube 12 having a speed of rotation equal to the speed of rotation of the shaft 5.

These connection means 31 include a self-locking coupling 32 of the claw clutch type that can be arranged on a static reference member 8, such as a fastening stud that is secured to the bottom of the main gearbox 6, for example. The self-locking coupling 32 may be provided with slots 32' opening out onto sloping surfaces 32" that co-operate with projections 8' on the static reference member 8.

It should be noted that the connection means 31 may also include coupling means 100 arranged between the rod 13 carrying the upper permanent magnet 22 and the self-locking coupling 32 so as to allow said upper permanent magnet 22 and said self-locking coupling 32 to be out of alignment with each other.

Figure 4:
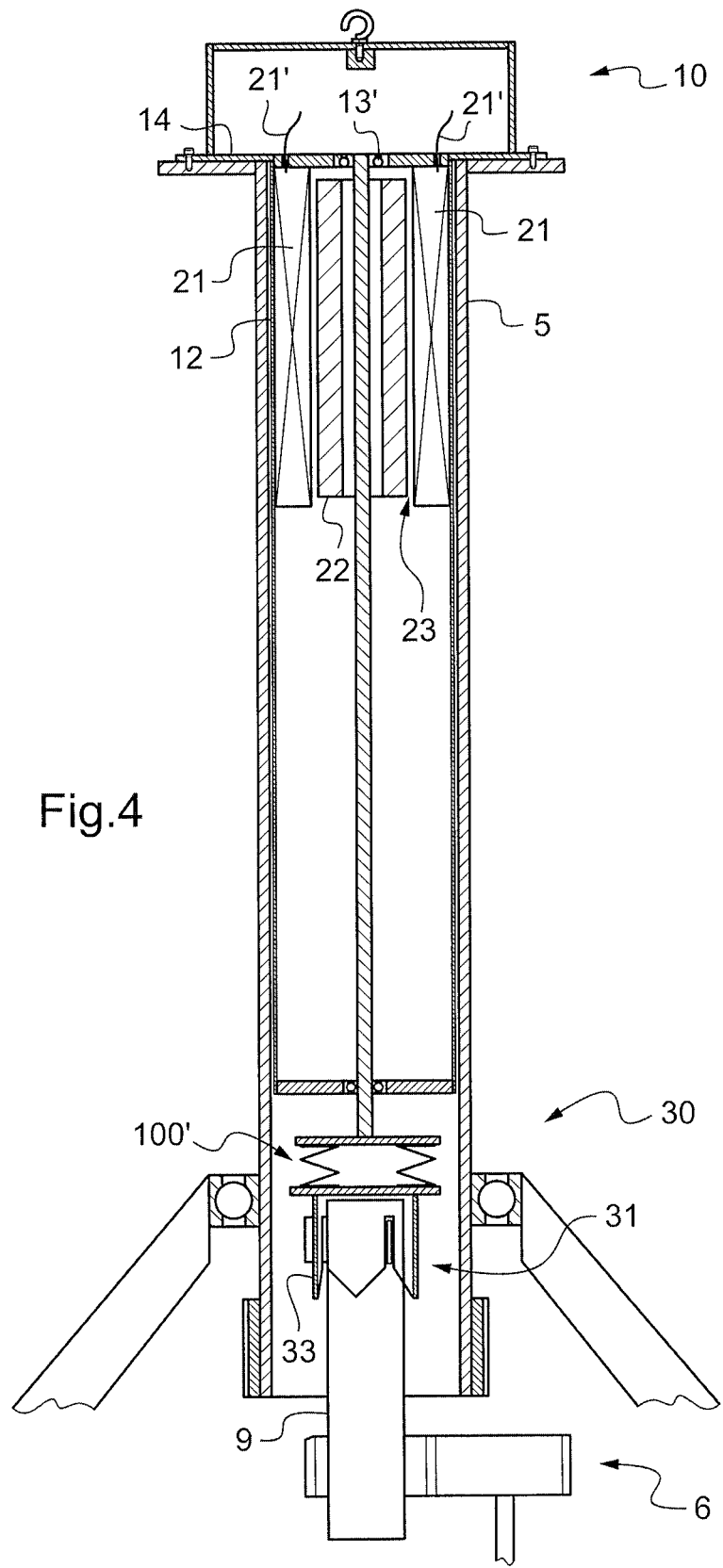
FIG. 4 shows said device in a second embodiment, as provided with an upper alternator.
Figure 5:
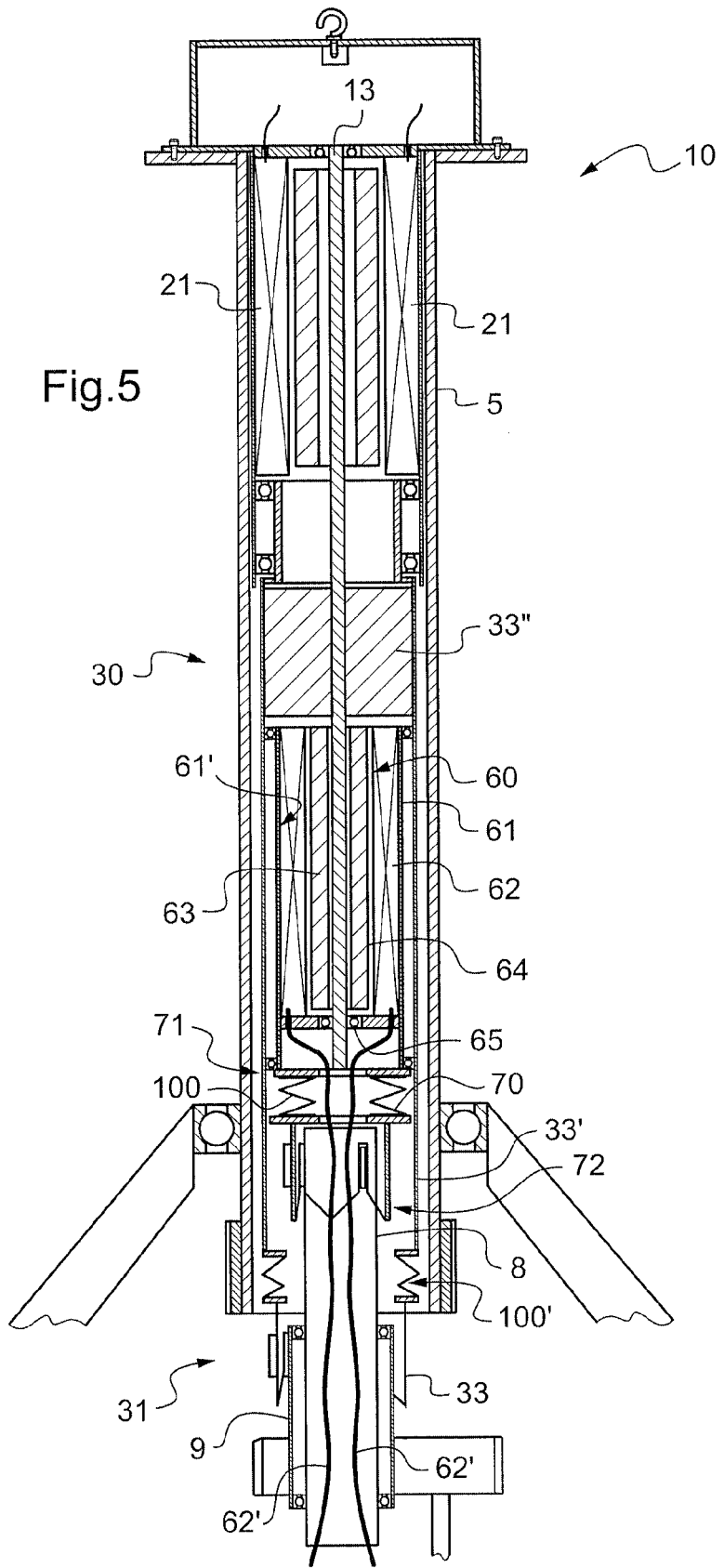
FIG. 5 shows said device in a second embodiment, as provided with an upper alternator and with a lower alternator.

FIGS. 4 to 5 show a device 10 in a second embodiment.

In this second embodiment, the mechanism 30 is provided with connection means 31 including a drive coupling 33 in engagement with a rotary reference member 9, such as a gear of a main gearbox 6.

The rotary reference member 9 then drives the rod 13 via the drive coupling 33 of the connection means 31 in rotation in a first direction at a first speed, the upper tube being caused to rotate by the shaft in a second direction and at a second speed. The first direction then differs from the second direction and/or the first speed differs from the second speed.

The variant in FIG. 4 shows a device 10 provided with a single alternator which, in this example, is an upper alternator 20.

In addition, the drive coupling may be secured to the rod 13. However, the connection means 31 may include a coupling member 100' allowing, for example, the drive coupling 33 and the rod 13 to be out of alignment with each other.

It should be noted that the device 10 may include guide means for guiding the rod 13.

With reference to FIG. 5, the mechanism 30 may include an intermediate tube 33' and a cog 33" secured to the rod 13. The drive coupling 33 may then be secured to the intermediate tube 33' meshing with the cog 33" of the rod 13. For example, the drive coupling is fastened to the intermediate tube 33' directly or indirectly by a coupling member 100' of the connection means 31 in the embodiment shown.

It should be noted that this variant of the second embodiment makes it possible to equip the device 10 with a lower alternator 60, designed, for example, for electrically powering electrical equipment situated in the airframe of the aircraft and thus within a frame of reference that is static unlike the rotary frame of reference of the rotor.

Said lower alternator 60 is provided with a static lower tube 61 that is connected via a connection member 70 to a static element 8 of the aircraft.

This connection member may include coupling means 100 enabling a first portion 71 of the connection member connected to the lower tube 61 to be out of alignment with a second portion 72 of the connection member connected to a self-locking coupling 72 for fastening to said static element 8.

In addition, the lower alternator 60 includes lower coils 62 fastened against a lower inside peripheral surface 61" of the lower tube. These lower coils 62 are separated from at least one lower permanent magnet 63 of the rod 13 by a lower airgap 64.

The lower coils can electrically power equipment in the airframe of the aircraft via connections 62'.

It should be noted that it is possible to provide guide means between the rod 13 and the lower alternator 60, such as lower ball or roller rolling bearing means 65 arranged between the lower tube 61 and the rod 13.

Like the upper alternator 20, the lower alternator 60 may include fuse means so that the rotary rotor is not jammed in the event of failure.

FIGS. 6 to 9 show various variants of a third embodiment.

In this third embodiment, the mechanism 30 includes a mechanical transmission for accelerating or slowing down the rod 13, and therefore for accelerating or slowing down the permanent magnets on the rod 13.

The mechanical transmission 50 is provided with a sun gear 53 secured of the rod 13 and with a toothed ring 52, a plurality of planet gears 51 being interposed between the toothed ring 52 and the sun gear 53.

The planet gears are then carried by a planet carrier 54 co-operating with a self-locking member 55 for connecting to a static receiving member 8 of the aircraft.

Figure 6:
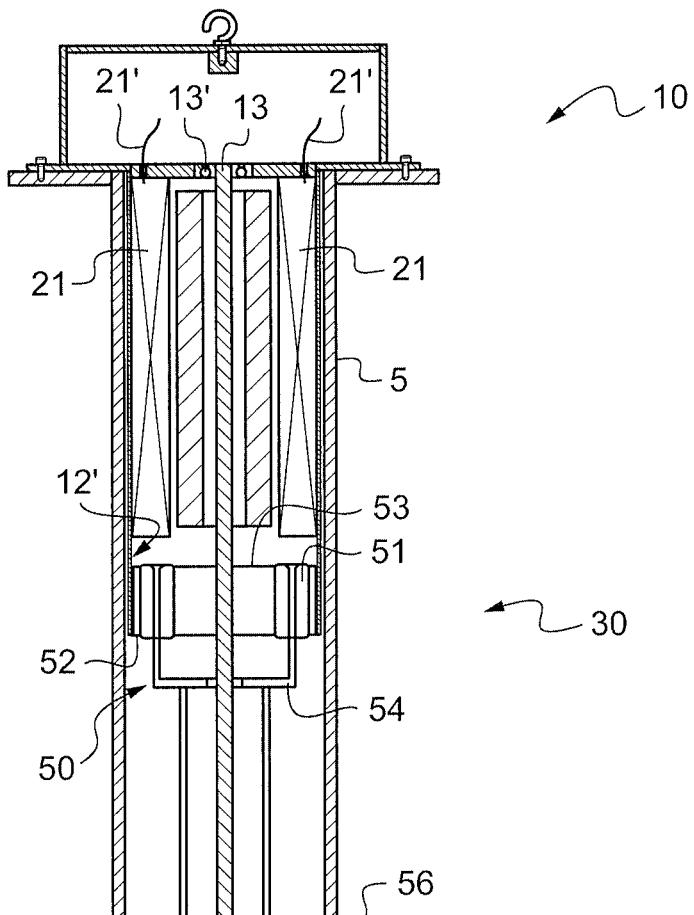
FIG. 6 shows said device in a first variant of a third embodiment, as provided with an upper alternator.

In the first variant of the third embodiment shown in FIG. 6, which shows a device 10 provided with a single alternator which, in this example, is an upper alternator 20, the ring 52 is secured to the upper tube 12. The upper tube 12 then drives the rod 13 via the mechanical transmission 50.

In addition, the self-locking member 55 represents a self-locking coupling 32 of the connection means 31 connected to a static reference member.

For example, the planet carriers 54 comprise a support tube 56 secured to the connection means 31, these connection means 31 including coupling means 100 and the self-locking coupling 55.

In this embodiment, the mechanism 30 therefore includes in succession a mechanical transmission 50, a support tube 56 and then connection means 31 comprising coupling means 100 and a self-locking member 55.

Figure 7:
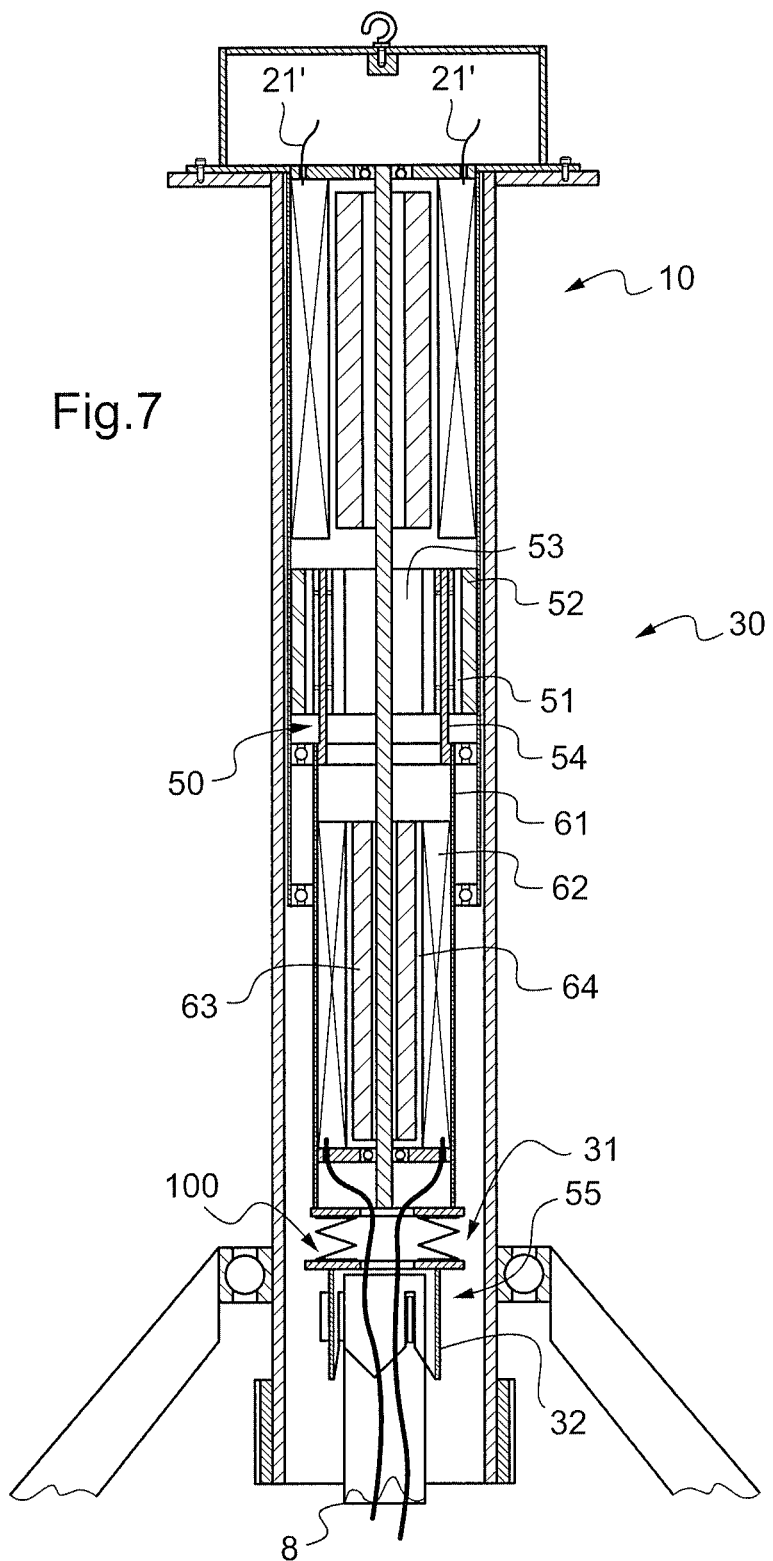
FIG. 7 shows said device in a first variant of a third embodiment, as provided with an upper alternator and with a lower alternator.

FIG. 7 shows a preferred variant of the invention, corresponding to the first variant of a third embodiment, as applied to a device 10 provided with a lower alternator 60.

The planet carrier 54 is then secured to the lower tube 61 of the lower alternator 60, said lower tube 61 optionally being connected to the self-locking member 55 by the coupling means 100.

In this embodiment, the mechanism 30 includes in succession a mechanical transmission 50, a lower tube 61 of a lower alternator and then connection means 31 comprising coupling means 100 and a self-locking member 55.

Figure 8:
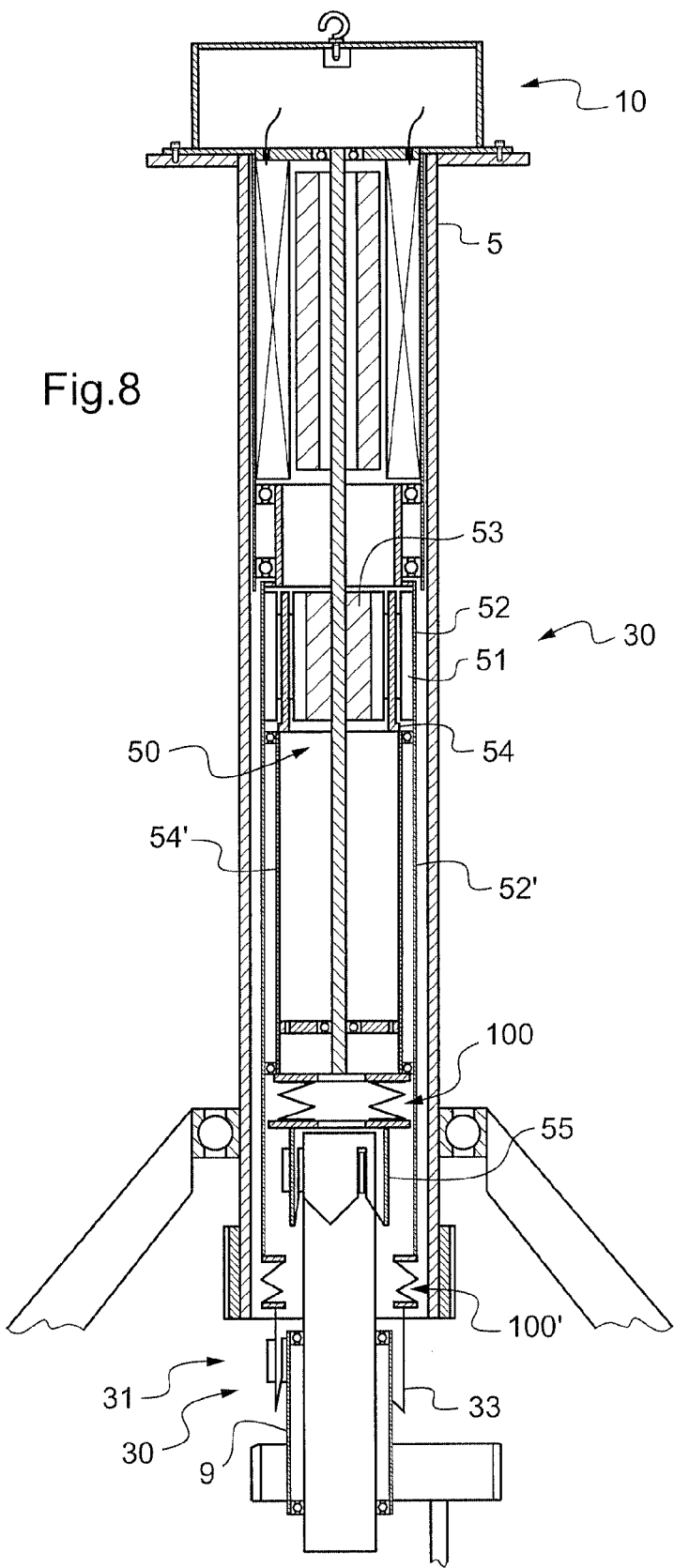
FIG. 8 shows said device in a second variant of a third embodiment, as provided with an upper alternator.
Figure 9:
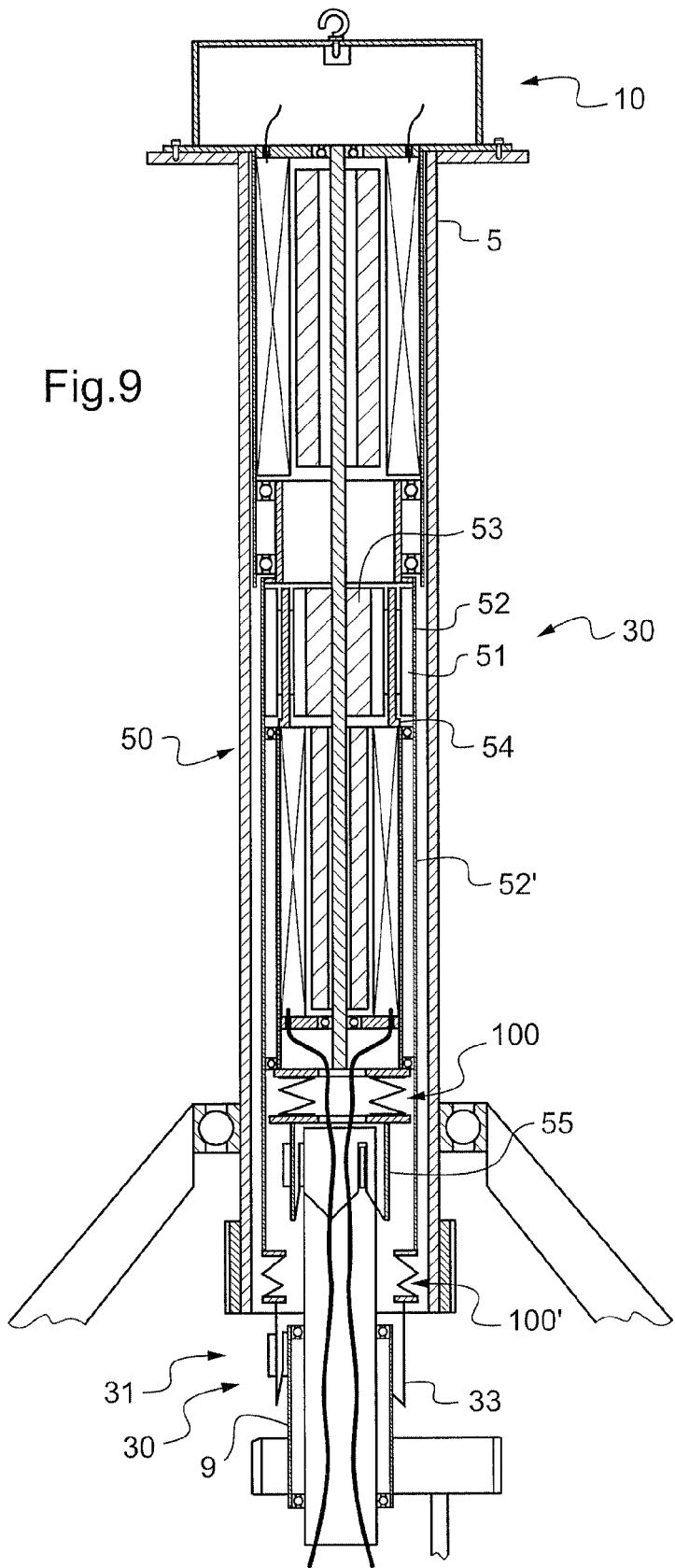
FIG. 9 shows said device in a second variant of a third embodiment, as provided with an upper alternator and with a lower alternator.

FIGS. 8 and 9 show a second variant of the third embodiment.

In this second variant of the third embodiment, the ring 52 co-operates with connection means 31 provided with a drive coupling 33 driven by a rotary reference member 9 of the aircraft. This ring 52 may be meshed with a cog of an intermediate tube 52' carrying said drive coupling 33 either directly or indirectly via a coupling member 100'.

According to the second variant of the third embodiment shown in FIG. 8 which shows a device 10 provided with a single alternator and in particular an upper alternator 20, the planet carrier 54 comprises a support tube 54' secured to coupling means 100 allowing non-alignment, these coupling means being secured to the self-locking member 55.

In this variant, the mechanism 30 therefore includes:
a mechanical transmission 50;
a support tube 54' for supporting a planet carrier 54 of the mechanical transmission 50, which support tube co-operates with first connection means including coupling means 100 and a self-locking member 55 for fastening to a static reference member; and
an intermediate tube 52' meshing with a ring 52 of the mechanical transmission 50, the intermediate tube 52' co-operating with second connection means 31 provided with coupling means 100' and provided with a drive coupling 33 suitable for being driven by a rotary reference member.

FIG. 9 shows a variant corresponding to the second variant of the third embodiment, as applied to a device 10 provided with a lower alternator 60.

The planet carrier 54 is then secured to the lower tube 61 of the lower alternator 60, said lower tube 61 optionally being connected to the self-locking member 55 by the coupling means 100.

In this variant, the mechanism 30 therefore includes:
a mechanical transmission 50;
a lower tube 61 secured to a planet carrier 54 of the mechanical transmission 50, which lower tube 61 co-operates with first connection means including coupling means 100 and a self-locking member 55 for fastening to a static reference member; and
an intermediate tube 52' meshing with a ring 52 of the mechanical transmission 50, the intermediate tube 52' co-operating with second connection means 31 provided with coupling means 100' and provided with a drive coupling 33 suitable for being driven by a rotary reference member.

It should be noted that the mechanism can impart high speeds of relative rotation between the upper winding and the upper magnet.

For example, with the aircraft being a rotorcraft, the shaft 5 may be driven at a speed lying approximately in the range from 200 revolutions per minute (rpm) to 400 rpm.

In addition, the rotary member 9 may optionally drive the ring 52 of the mechanism at a speed of rotation of about 2000 rpm. Conversely, the planet carrier 54, and the lower tube 61 optionally carrying the lower winding are static.

The rod 13 can then move with a rotary movement at a speed of about 10,000 rpm, for example.

Naturally, numerous implementation variations may be made to the present invention. Although several embodiments are described above, it can readily be understood that it is not conceivable to identify exhaustively all of the possible embodiments. It is naturally possible to replace any of the means described with equivalent means without going beyond the ambit of the present invention.

What is claimed is:

1. An electrical power supply device for electrically powering at least one item of equipment on a rotary rotor driven by a shaft, said device comprising a removable stick suitable for being secured reversibly to said shaft, wherein said stick includes an upper alternator and an upper tube suitable for being secured to said shaft so as to be constrained in rotation therewith, said upper alternator having a plurality of upper coils fastened to an upper inside peripheral surface of said upper tube, said stick having a rod carrying at least one upper permanent magnet of said upper alternator separated from said upper coils by a predetermined upper air gap, at least one upper rolling bearing means being interposed between said rod and said upper tube, said device having a mechanism so that said rod and said upper tube move with distinct rotary movements, said mechanism having connection means so as to be connectable to a reference member of an aircraft.

2. An electrical power supply device according to claim 1, wherein, with said stick having a projecting fastening flange, said device further comprises a wheel made of a flexible material chosen from the group comprising elastomers, and fastened to said flange, said wheel being provided with peripheral dogs suitable for co-operating by shape interference with a rotary member of a rotary rotor.

3. An electrical power supply device according to claim 1, wherein, with said rotary rotor having a plurality of distinct electrical zones, said upper alternator includes one upper coil per electrical zone.

4. An electrical power supply device according to claim 1, wherein each upper coil has redundancy.

5. An electrical power supply device according to claim 1, wherein the torque induced in the event of said upper coils short-circuiting is equal to the nominal operating torque of the upper alternator.

6. An electrical power supply device according to claim 1, wherein said mechanism is provided with connection means including a self-locking coupling for coupling to a static reference member.

7. An electrical power supply device according to claim 1, wherein said mechanism is provided with connection means provided with a drive coupling suitable for being driven by a rotary reference member.

8. An electrical power supply device according to claim 1, wherein said mechanism is provided with connection means, and wherein said mechanism includes a mechanical transmission provided with a plurality of planet gears meshing firstly with a toothed ring and secondly with a sun gear on said rod, said planet gears being carried by a planet carrier co-operating with a self-locking member for connecting to a static receiving member.

9. An electrical power supply device according to claim 8, wherein said mechanism is provided with connection means, and wherein said self-locking member is a self-locking coupling of the connection means.

10. An electrical power supply device according to claim 8, wherein said toothed ring is fastened to said upper inside peripheral surface.

11. An electrical power supply device according to claim 8, wherein said toothed ring is provided with connection means provided with a drive coupling suitable for being driven by a rotary reference member.

12. An electrical power supply device according to claim 1, further comprising a lower alternator provided with a lower tube provided with a non-rotary connection member, said lower alternator having a plurality of lower coils fastened to a lower inside peripheral surface of said lower tube, said rod carrying at least one lower permanent magnet of said bottom alternator separated from said lower coils by a predetermined lower air gap, at least one bottom rolling bearing means being interposed between said rod and said lower tube.

13. An electrical power supply device according to claim 12, wherein said connection member includes coupling means making it possible for a first portion and a second portion of said connection member to be out of alignment with each other.

14. An electrical power supply device according to claim 12, wherein said lower tube includes a planet carrier carrying a plurality of planet gears in engagement with a sun gear on said rod and with a toothed ring.

15. An aircraft provided with a rotary rotor, including a removable device according to claim 1.

* * * * *